(12) United States Patent
Casati et al.

(10) Patent No.: US 7,301,934 B1
(45) Date of Patent: Nov. 27, 2007

(54) UMTS TELECOMMUNICATIONS SYSTEM FOR ENABLING A MOBILE STATION TO RECEIVE VOICE-OVER INTERNET PROTOCOL CALLS WHEN ROAMING

(75) Inventors: Alessio Casati, Wooton Bassett (GB); Sudeep Kumar Palat, Grange Park (GB); Hatef Yamini, London (GB); Jin Yang, Maidenhead (GB)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/030,387

(22) PCT Filed: Apr. 18, 2000

(86) PCT No.: PCT/GB00/01481

§ 371 (c)(1),
(2), (4) Date: Jun. 4, 2002

(87) PCT Pub. No.: WO01/06744

PCT Pub. Date: Jan. 25, 2001

(30) Foreign Application Priority Data

Jul. 21, 1999 (EP) .................................. 99305778

(51) Int. Cl.
*H04L 12/66* (2006.01)

(52) U.S. Cl. .................... 370/352; 455/432.1; 455/436

(58) Field of Classification Search ................ 370/352, 370/469, 329; 455/445, 439, 555
See application file for complete search history.

(56) References Cited

U.S. PATENT DOCUMENTS

| | | | |
|---|---|---|---|
| 6,104,929 A * | 8/2000 | Josse et al. .................. | 455/445 |
| 6,611,516 B1 * | 8/2003 | Pirkola et al. ............... | 370/352 |
| 6,690,679 B1 * | 2/2004 | Turunen et al. .............. | 370/469 |
| 6,807,431 B2 * | 10/2004 | Sayers et al. ............... | 455/555 |
| 7,023,855 B2 * | 4/2006 | Haumont et al. ......... | 370/395.1 |
| 2001/0031635 A1 * | 10/2001 | Bharatia ...................... | 455/432 |
| 2001/0043577 A1 * | 11/2001 | Barany et al. ............... | 370/328 |
| 2001/0050908 A1 * | 12/2001 | Verkama ...................... | 370/329 |
| 2002/0049059 A1 * | 4/2002 | Soininen et al. ............. | 455/439 |

FOREIGN PATENT DOCUMENTS

| WO | WO 99/05830 | 2/1999 |
|---|---|---|
| WO | WO 99/16266 | 4/1999 |

OTHER PUBLICATIONS

XP 002020137, Proposed Operation of GSM Packet Radio Networks by J. Hamalainen.

* cited by examiner

*Primary Examiner*—Chi Pham
*Assistant Examiner*—Albert T. Chou

(57) ABSTRACT

A telecommunication system including a mobile station, and means for a mobile station to receive voice-over Internet Protocol (VoIP) calls when it is roaming away from a home network, comprising: means for informing a serving GGSN of the International Mobile subscriber Identity (IMSI) of the called mobile station, and means for enabling a local VoIP control server to map a called MSISDN number to the IMSI number.

11 Claims, 2 Drawing Sheets

UMTS TELECOMMUNICATIONS SYSTEM FOR ENABLING A MOBILE STATION TO RECEIVE VOICE-OVER INTERNET PROTOCOL CALLS WHEN ROAMING

BACKGROUND OF THE INVENTION

This invention relates to a telecommunication system and in particular it relates to UMTS (Universal Mobile Telecommunications System).

Under UMTS proposals, a mobile station (MS) can be connected via radio interface both as an IP (Internet Protocol) terminal and as a traditional phone terminal. With an IP connection and the associated Quality of Service, QoS, mechanism, a terminal can make and receive a voice call via the packet-switch domain.

In order for an MS to receive a VoIP (Voice over Internet Protocol) call, it has to have an IP address assigned so that it can receive call setup messages and media streams over IP. However, under current UMTS specifications, a UMTS core network (CN) can initiate a PDP (Packet Data Protocol) context set up only for static IP addresses. This is because only the home gateway GPRS Support Node (GGSN) associated with the static IP address holds the IP to IMSI (International Mobile Subscriber Identity) address mapping required to contact the home location register (HLR), where GPRS denotes General Packet Radio System. When dynamic IP addressing is used and when an MS is not in an active PDP context, the network cannot initiate a PDP context set up and therefore the MS cannot receive calls.

DESCRIPTION OF THE PRIOR ART

Presently, there are two known solutions which enable a MS to receive VoIP (Voice over Internet Protocol) calls. These are 1) to use static IP address allocation or 2) to use dynamic IP address assignment but requiring an active PDP context to be always maintained.

These known solutions have several drawbacks. For the first solution of using static IP address allocation, an IP address is required for each mobile station regardless of its states. This is a waste of very limited IP address space. Also, for this solution, the assigned IP for a mobile station address reflects its association of its home network address space. According to the IP routing mechanism, the IP packets need to be routed via its home network regardless of its current location. This can result in significant effects on performance and service quality.

For the second known solution, an active PDP context needs to be maintained even when a mobile station is not in communication. This represents a waste of IP address space and other network resources such as the resource for PDP management.

The present invention arose in an attempt to provide an improved solution for a mobile station to receive the VoIP (Voice over Internet Protocol) calls.

International Patent Publication WO9916266A and a paper by Haemelaeinen et al "Proposed Operation of GSM Packet Radio Networks" IEEE International Symposium on Personal, Indoor and Mobile Radio Communications, vol 1, pages 372-377, 27.09.95 XP002020137 are also here mentioned as technological background.

BRIEF SUMMARY OF THE INVENTION

According to the present invention, there is provided a Universal Mobile Telecommunications System UMTS telecommunication system including a mobile station, having a Mobile Subscriber Integrated Services Digital Network MSISDN number associated with the station or its user, and means for enabling the mobile station to receive Voice-Over Internet Protocol VoIP calls established when dynamic Internet Protocol IP addressing is used and the mobile station is not in an active Packet Data Protocol PDP context whilst roaming away from a home network, comprising: means for informing a serving Gateway GPRS Serving Node GGSN of the roaming network of the International Mobile subscriber Identity IMSI of the called mobile station, and means for enabling a serving VoIP call control server to map a called MSISDN number to the IMSI number.

A mapping table may be stored. Alternatively an enhanced terminal registration message may be provided so that, upon registration of a mobile station at a visiting network, the mobile station informs the serving VoIP call control server of its IMSI number.

In a further aspect there is provided a method of enabling a mobile station of a Universal Mobile Telecommunications System UMTS telecommunications system to receive VoIP calls established when dynamic IP addressing is used and the mobile station is not in an active PDP context whilst roaming away from a home network, the mobile station or its user having an associated MSISDN number, the method comprising informing a serving GGSN of the roaming network, of the IMSI number of the mobile station, and enabling a serving VoIP control server to map the MSISDN number of the mobile to the IMSI number.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS OF THE INVENTION

Figure 1:
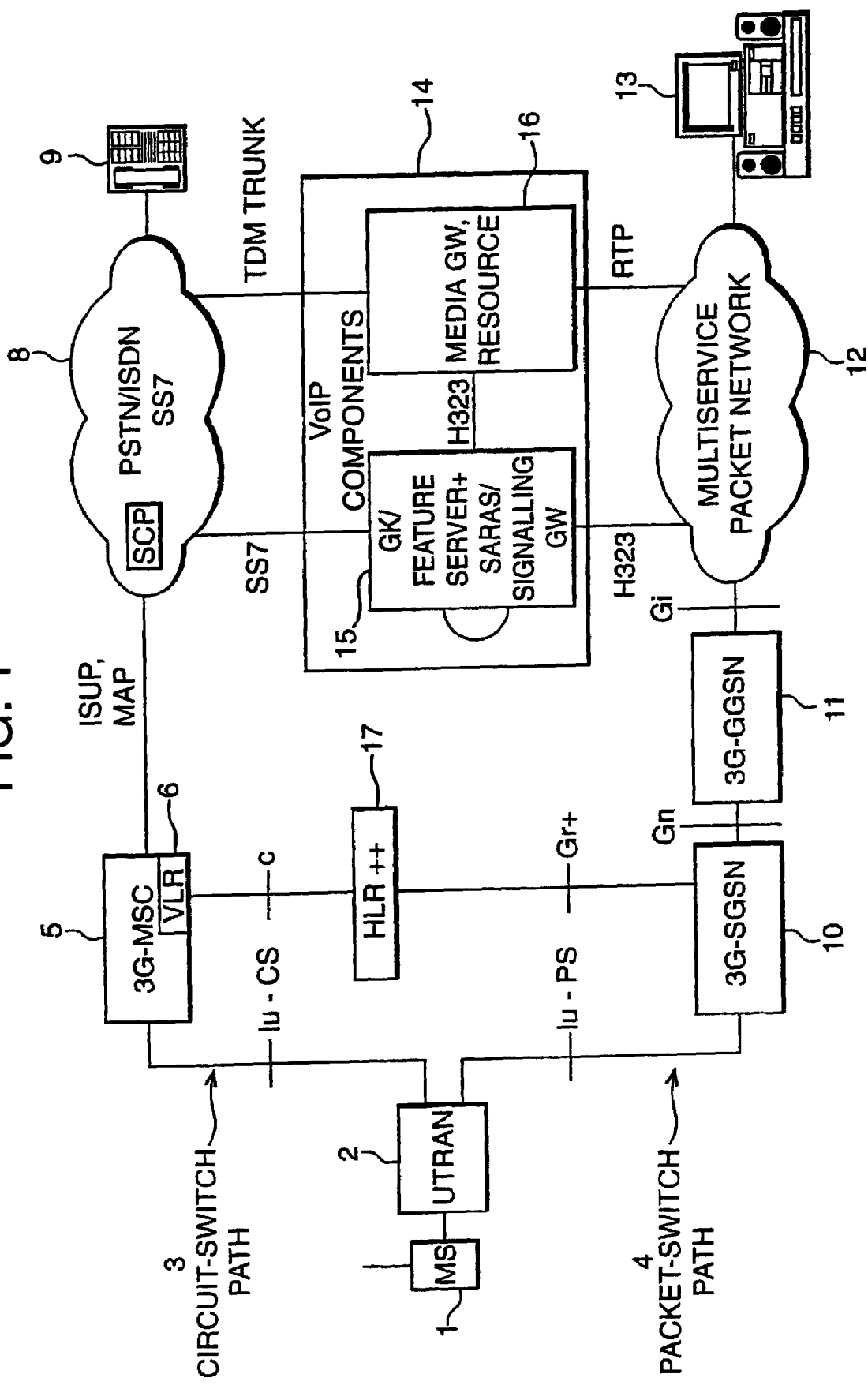
FIG. 1 shows a UMTS mobile station connected via a radio interface to make and receive voice calls by either a circuit switch or packet-switch domain.

A UMTS mobile station (MS) can be connected via a radio interface both as an IP terminal and as a traditional mobile voice terminal. With an IP connection and the associated QoS (Quality of Service) mechanism, a terminal can make and receive a voice call via either the circuit-switch domain or the packet-switch domain. This is illustrated in FIG. 1. A mobile station 1 is linked by a radio link to the UMTS Terrestrial Radio Access Network, UTRAN 2. A call may then be routed over a circuit-switch path, shown generally as 3, or a packet-switch path shown generally as 4. If the call is to be via the circuit-switch path, then it is passed through a switching circuit 5 which includes a visiting location register VLR 6. It is then routed through the PSTN/ISDN network 8 to a receiving telephone terminal 9.

If a call is to be made over the packet-switch path 4, then it is routed via a Serving GPRS Support Node (SGSN) 10 and a gateway GPRS support node (GGSN) 11 to a multi-service packet network 12 and thence onwards to a receiver such as a computer 13.

The same paths are of course used when the mobile station is receiving a call.

Note that in the Figure the term 3G refers to "third generation".

To enable a voice call across packet network and circuit networks, a voice over Internet protocol Interworking Function VoIP IWF 14 is required. This has two major components, a gatekeeper/signalling gateway 15 and a media gateway 16. The gatekeeper 15 provides call control functionality and supplemental features such as call forwarding, call waiting and multiple-way call. The gatekeeper also provides functions such as address translation, admission control such that permission to complete call and set bandwidth limitations, manages gateways and controls call signalling, call management, reporting and logging. The signalling gateway part provides signalling into working at an interface to the SS7 (Signalling System No. 7) network.

The media gateway 16 provides many services such as protocol and media translations. It performs bi-directional synchronous/asynchronous conversion (Time Division Multiplex (TDM) to packet) and signalling inter-working functions including control interface and connection management.

HLR 17 is a Home Location Register.

In order for a mobile station to receive a VoIP call, it has to have an IP address assigned so that it can receive call setup messages and media streams over IP.

According to a current UMTS specification, UMTS CN can initiate a PDP context setup only for static IP addresses. This is because only the GGSN associated with the static IP address holds the IP to IMSI address mapping required to contact the HLR. However, when dynamic IP addressing is used and when an MS is not in an active PDP context, the network cannot initiate PDP context setup and hence the MS cannot receive calls.

As described above, present methods of overcoming this problem are unsatisfactory.

The present invention is based on two assumptions. Firstly, the mobile user agrees to receive the VoIP calls when there is no PDP context yet established and secondly a mechanism must be provided in which, for any MS in its domain, the home gatekeeper is aware of the gatekeeper and its associated IP address that is currently serving the MS if it is roaming.

The present invention provides a solution to the problems of the prior art which supports dynamic IP address assignment and enables mobile terminated calls without pre-established PDP context. Essentially, the invention includes a mechanism for informing the serving GGSN of the IMSI number of the called MS, and a mechanism for the local (i.e. serving) gatekeeper (GK) to map the called Mobile Subscriber Integrated Services Digital Network MSISDN number to an IMSI number.

In order to achieve this in embodiments of the invention, an interface is required, between the serving GGSN and the serving gatekeeper (or other VoIP call control server) in order for the GGSN to receive a request from the gatekeeper to initiate a PDP context setup procedure using the IMSI number of the mobile station. In such a request, the Quality of Service QoS requirement can be indicated for the PDP context. QoS parameters can be passed to the PDU notification message the GGSN sends to the serving GPRS support mode SGSN to get the mobile station to initiate a PDP context activation request. After PDP context is set up, the GGSN replies with the IP address of the mobile station. The entities which are involved, i.e. the GGSN and the gatekeeper or other entity, are within the same administrative domain (i.e. network). The association between the gatekeeper and the GGSN can be pre-configured.

In order to trigger a PDP context setup using the IMSI number, a mechanism is required for the local gatekeeper to map the MSISDN number to the IMSI number.

The IMSI number is a number which is associated with the mobile station (or more commonly with the subscriber identification module) SIM (card) which the user places within the mobile station, and which uniquely identifies that station or SIM. The number is generally not made public.

Two alternatives for triggering the PDP context set-up are proposed.

Firstly, the home gatekeeper of the called mobile station may be enhanced in order to map the mobile station's MSISDN number to its IMSI number. This mapping will be static and so the mapping table can be stored in a directory server for example and use an interface within the gatekeeper and the directory server to perform the mapping. Alternatively, an interface between the gatekeeper and the home location register (HLR) can be provided. In that case, the home gatekeeper then needs to pass the IMSI number of the called mobile station to the serving gatekeeper in the standard call setup message. For example, when so-called H.323 messaging is used, the IMSI number is inserted as an alias address for the called party in a setup message. If SIP (Session Imitation Protocol) is used, then the IMSI number can be put as an alias in other messages. For H.323 messaging the VOIP call control server will be an H323 gatekeeper and for SIP it will be an SIP proxy/server.

A second alternative is to enhance the terminal registration message so that a mobile station can inform the local gatekeeper of its IMSI number. This can be done by putting both its IMSI number and its MSISDN number as aliases of the mobile station. The local gatekeeper can then maintain a mapping table between the MSISDN and IMSI numbers.

Figure 2:
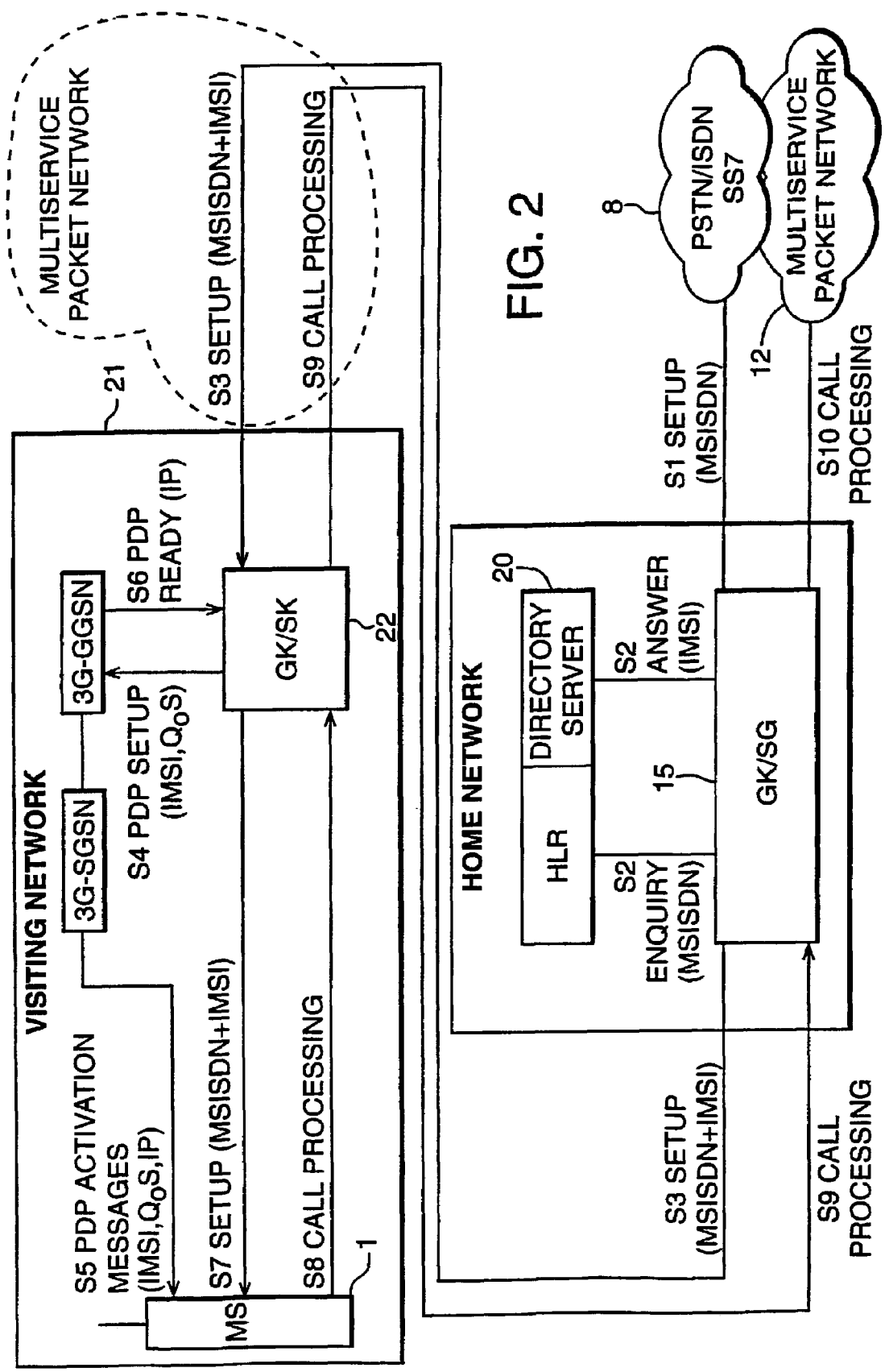
FIG. 2 shows a call setup procedure protocol to a roaming mobile station.

FIG. 2 illustrates a call setup procedure for a call destined to a roaming mobile station MS1. A call is required to be set up from a calling party not shown over either the PSTN/ISDN domain 8 or over multi-service packet network 12. The following steps are used.

Step S1—A call setup message, e.g. H225 set up message arrives at the home gatekeeper signalling gateway 15 of the called mobile station, i.e. GK/SG 15 of the home network of the mobile station.

Step S2—The home gatekeeper 15 checks with the directory server 20 or the home location register HLR 17 and maps the called MSISDN number to the IMSI of the called mobile station.

Step S3—The home gatekeeper 15 is aware of the serving gatekeeper in the visiting network 21 where the called mobile station is currently roaming, and relays the modified call setup message in which the IMSI number is inserted as an alias address of the called mobile station.

Step S4—Upon receiving the setup message, the serving gatekeeper 22 of the visiting network checks if there is an IMSI number for the called mobile station.

Step S5—If an IMSI number is presented, the gatekeeper 22 contacts the serving GGSN 23, which starts a PDP context setup procedure. If no IMSI number is presented and there is no PDP context associated with the called mobile station, then the serving gatekeeper 22 rejects the call request.

Step S6—Once a PDP context is established, the serving GGSN 23 returns the assigned IP address of the called mobile station to the serving GK 22. It will be recalled that the serving GK is provided with a mapping table to map the mobile station's MSISDN number to its IMSI number.

Step S7—The serving GK then relays the call set message to the mobile station over IP.

Step S8—The mobile station answers the call setup with a call processing message to the serving GK.

Step S9—The serving GK then relays the call processing message to the home network GK15.

Step S10—The home GK then relays the call processing message to the calling party.

The above represents a call set up procedure assuming that the home GK of the called MS is enhanced to map an MSISDN number to its IMSI number.

It is then possible to set up the message in conventional manner and the subsequent steps of the message are not shown.

The invention claimed is:

1. A Universal Mobile Telecommunications System (UMTS) telecommunication system including a mobile station, having a Mobile Subscriber Integrated Services Digital Network (MSISDN) number associated with the station or its user, and means for enabling the mobile station to receive Voice-Over Internet Protocol (VoIP) calls established when dynamic Internet Protocol (IP) addressing is used and the mobile station is not in an active Packet Data Protocol (PDP) context whilst roaming away from a home network, comprising: means for informing a serving Gateway GPRS Serving Node (GGSN) of the roaming network of the International Mobile subscriber Identity (IMSI) of the called mobile station, and means for enabling a serving VoIP call control server to map a called MSISDN number to the IMSI number, and further including an interface between the serving GGSN and the serving VoIP call control server, enabling the GGSN to receive a request from the VoIP server to initiate PDP context set up procedures using the IMSI number of the mobile station.

2. A telecommunications system as claimed in claim 1, wherein the Quality of Service Requirement (QoS) is indicated for the PDP context.

3. The system of claim 1 including a stored mapping table which contains a mapping of the MSISDN number of the mobile station to its IMSI number, the table being stored where it can be accessed by the home VoIP call control server for passing the IMSI number to the serving VoIP call control server.

4. The system of claim 1, including means for providing an enhanced terminal registration message so that, upon registration, a mobile station informs the serving VoIP call control server of its IMSI number.

5. The system of claim 1, wherein the IMSI and MSISDN numbers are both put as aliases of the mobile station in one or more call setup messages between home and serving VoIP call control server.

6. The system of claim 1, wherein the VoIP call control server is an H.323 gatekeeper or a Session Initiation Protocol (SIP) proxy/server.

7. A method of enabling a mobile station of a Universal Mobile Telecommunications System (UMTS) network to receive Voice-Over Internet Protocol (VoIP) calls established when dynamic Internet Protocol (IP) addressing is used and the mobile is not in an active Packet Data Protocol (PDP) context while roaming away from a home network, the mobile station or its user having an associated Mobile Subscriber Integrated Services Digital Network (MSISDN) number, the method comprising providing the International Mobile Subscriber Identity (IMSI) number of the mobile station to a serving Gateway GPRS Serving Node (GGSN) of the roaming network; and enabling a serving VoIP control server to map the MSISDN number of the mobile station to the IMSI number, and the method further including providing an interface between the serving GGSN and the serving VoIP call control server, enabling the GGSN to receive a request from the VoIP server to initiate PDP context set up procedures using the IMSI number of the mobile station.

8. A method as claimed in claim 7, including providing a stored mapping table, accessible by the home VoIP call control server, which maps the MSISDN number to its IMSI number.

9. A method as claimed in claim 8, wherein the home VoIP call control server passes the IMSI number to the serving VoIP call control server.

10. A method as claimed in claim 7, wherein when the mobile station registers with the roaming network, it informs the serving VoIP call control server with its IMSI number.

11. A method as claimed in claim 8, wherein the IMSI number of the called party is passed from home VoIP call control server to serving VoIP call control server in the one or more call setup messages.

* * * * *